US011265139B2

(12) United States Patent
Park

(10) Patent No.: US 11,265,139 B2
(45) Date of Patent: Mar. 1, 2022

(54) METHOD FOR TRANSMITTING GPS INFORMATION OF OPTICAL COMMUNICATION DEVICE

(71) Applicant: SOLiD, INC., Seongnam-si (KR)

(72) Inventor: Bum Soo Park, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/077,489

(22) Filed: Oct. 22, 2020

(65) Prior Publication Data

US 2021/0126767 A1  Apr. 29, 2021

(30) Foreign Application Priority Data

Oct. 23, 2019 (KR) .......... 10-2019-0132464
Oct. 22, 2020 (KR) .......... 10-2020-0137391

(51) Int. Cl.
| H04L 7/00 | (2006.01) |
| G04R 20/02 | (2013.01) |
| H04B 10/40 | (2013.01) |
| H04B 10/50 | (2013.01) |

(52) U.S. Cl.
CPC .......... *H04L 7/0075* (2013.01); *G04R 20/02* (2013.01); *H04B 10/40* (2013.01); *H04B 10/50* (2013.01)

(58) Field of Classification Search
CPC ....... H04B 10/40; H04B 10/50; H04L 7/0075; G04R 20/02
USPC ........................................ 398/154
See application file for complete search history.

(56) References Cited

U.S. PATENT DOCUMENTS

| 8,472,370 B2 | 6/2013 | Shin et al. |
| 8,582,607 B2 | 11/2013 | Surek et al. |
| 10,389,438 B2 | 8/2019 | Heo et al. |
| 2007/0081827 A1* | 4/2007 | Ide .......... H04B 10/66 398/209 |
| 2012/0169542 A1* | 7/2012 | Mathews ...... H04B 1/709 342/450 |

(Continued)

FOREIGN PATENT DOCUMENTS

WO  2018130362 A1  7/2018

OTHER PUBLICATIONS

Extended European Search Report dated Mar. 12, 2021 in European Application No. 20203570.5.

*Primary Examiner* — Dalzid E Singh
(74) *Attorney, Agent, or Firm* — Sughrue Mion, PLLC

(57) ABSTRACT

An optical communication device including a GPS receiver receiving and outputting a GPS signal from a satellite; a main controller configured to generate and output synchronization data based on the GPS signal; and an optical transceiver configured to generate an optical signal by superposing input payload data and the synchronization data, and to output the optical signal, wherein a first communication channel corresponding to the payload data and a second communication channel corresponding to the synchronization data are different communication channels. According to embodiments, GPS information for synchronization together with payload data, which is information to be transmitted, may be efficiently transmitted between optical communication devices located in remote locations without separate wavelength allocation and connection of an optical cable, by using an auxiliary management and control channel (AMCC).

10 Claims, 3 Drawing Sheets

(56) References Cited

U.S. PATENT DOCUMENTS

| | | | |
|---|---|---|---|
| 2016/0033649 A1* | 2/2016 | Mathews | G01S 19/246 |
| | | | 342/357.48 |
| 2018/0062825 A1* | 3/2018 | Miao | H04J 14/0221 |
| 2019/0165865 A1* | 5/2019 | Nakagawa | H04J 14/0241 |
| 2020/0413360 A1* | 12/2020 | Ruffini | H04W 72/082 |
| 2021/0185628 A1* | 6/2021 | Huang | H04W 76/14 |

* cited by examiner

METHOD FOR TRANSMITTING GPS INFORMATION OF OPTICAL COMMUNICATION DEVICE

CROSS-REFERENCE TO RELATED APPLICATION

This application claims the benefit of Korean Patent Application No. 10-2019-0132464, filed on Oct. 23, 2019, and Korean Patent Application No. 10-2020-0137391, filed on Oct. 22, 2020, in the Korean Intellectual Property Office, the disclosures of which are incorporated herein in its entirety by reference.

BACKGROUND

1. Field

The disclosure relates to a method of transmitting GPS information of optical communication device.

2. Description of the Related Art

In a base station installed to provide a mobile communication service, a digital unit (DU) having a digital processing function and a radio unit (RU) having a radio signal processing function are connected to each other through an access network. The DU located in a central office is connected to a plurality of RUs distributed in a cell site through a dedicated line. In general, one DU and one RU are connected to each other through a single optical cable. Therefore, the DU located in the central office and each of the plurality of RUs distributed in the cell site are connected to each other by constructing a separate access network through a dedicated line.

The DU located in the central office may synchronize a communication network using GPS signals transmitted from the plurality of RUs. To this end, in the related art, a separate wavelength for GPS signal transmission is set between the DU and the RU to transmit and receive GPS signals. In this case, there is a problem in that radio resources for payload data transmission are reduced due to additional wavelength allocation for GPS signal transmission. For this reason, a method of connecting a separate optical cable for GPS signal transmission between the DU and the RU is also used. However, in this case, there is a problem that manufacturing and installation costs are increased because an optical cable and additional components for transmitting GPS signals to the optical cable are required.

SUMMARY

Provided are methods of transmitting and receiving GPS information of an optical communication device capable of effectively transmitting and receiving GPS information for synchronization without using a separate optical cable or allocating a separate wavelength between optical communication devices located in remote locations.

Additional aspects will be set forth in part in the description which follows and, in part, will be apparent from the description, or may be learned by practice of the presented embodiments.

According to an aspect of an embodiment, an optical communication device includes a GPS receiver receiving and outputting a GPS signal from a satellite; a main controller configured to generate and output synchronization data based on the GPS signal; and an optical transceiver configured to generate an optical signal by superposing input payload data and the synchronization data, and to output the optical signal, wherein a first communication channel corresponding to the payload data and a second communication channel corresponding to the synchronization data are different communication channels.

According to an exemplary embodiment, the optical transceiver may include a controller receiving the synchronization data and outputting the synchronization data as auxiliary management and control data for management and control of an optical transceiver of another optical communication device; and a transmitter generating the optical signal by superposing the input payload data and the synchronization data.

According to an exemplary embodiment, the main controller may extract a navigation message from the GPS signal to generate the synchronization data, and transmits the synchronization data to the optical transceiver.

According to an exemplary embodiment, the second communication channel may be an auxiliary management and control channel (AMCC).

According to an aspect of another embodiment, an optical communication device includes a first optical transceiver receiving a first optical signal, in which first payload data and first synchronization data are superposed, from a first other optical communication device connected to the first optical transceiver through a first optical cable, and separating the first synchronization data from the first optical signal and outputting the first synchronization data; a second optical transceiver receiving a second optical signal, in which second payload data and second synchronization data are superposed, from a second other optical communication device connected to the second optical transceiver through a second optical cable, and separating the second synchronization data from the second optical signal and outputting the second synchronization data; and a main controller configured to extract a reference synchronization signal by analyzing the first synchronization data and the second synchronization data, wherein the first payload data and the first synchronization data are received through different communication channels, and the second payload data and the second synchronization data are received through different communication channels.

According to an exemplary embodiment, the main controller may select one of the first synchronization data and the second synchronization data based on a result of the analyzing of the first synchronization data and the second synchronization data, and extract the reference synchronization signal from the selected synchronization data.

According to an exemplary embodiment, the first synchronization data may include a first navigation message extracted from a GPS signal received from the first other optical communication device, and the second synchronization data may include a second navigation message extracted from a GPS signal received from the second other optical communication device.

According to an exemplary embodiment, the first synchronization data and the second synchronization data may be received through an auxiliary management and control channel (AMCC).

According to an aspect of another embodiment, an optical communication system includes at least one first optical communication device configured to transmit an optical signal in which payload data and synchronization data corresponding to a GPS signal are superposed; and a second optical communication device receiving the optical signal from the at least one first optical communication device, separating the synchronization data from the optical signal, and extracting a reference synchronization signal based on the synchronization data, wherein the payload data and the synchronization data are transmitted through different communication channels.

According to an exemplary embodiment, the synchronization data may include a navigation message extracted from the GPS signal.

According to an exemplary embodiment, the first optical communication device may be composed of a plurality, and the second optical communication device may analyze synchronization data transmitted from each of the plurality of first optical communication devices, and extract the reference synchronization signal from synchronization data selected based on a result of the analyzing.

According to an exemplary embodiment, the synchronization data may be transmitted through an auxiliary management and control channel (AMCC).

According to embodiments, by transmitting GPS information for synchronization of a network, which is linked to optical communication devices or between the optical communication devices located in remote locations by using an AMCC for management and control between optical transceivers, GPS information may be efficiently transmitted without loss of resources due to separate wavelength allocation or increase in manufacturing and installation costs due to optical cables.

Effects obtainable by the embodiments of the disclosure are not limited to the effects described above, and other effects not described herein may be clearly understood by one of ordinary skill in the art to which the inventive concept belongs from the following description.

BRIEF DESCRIPTION OF THE DRAWINGS

Embodiments of the disclosure will be more clearly understood from the following detailed description taken in conjunction with the accompanying drawings in which.

DETAILED DESCRIPTION

Figure 1:
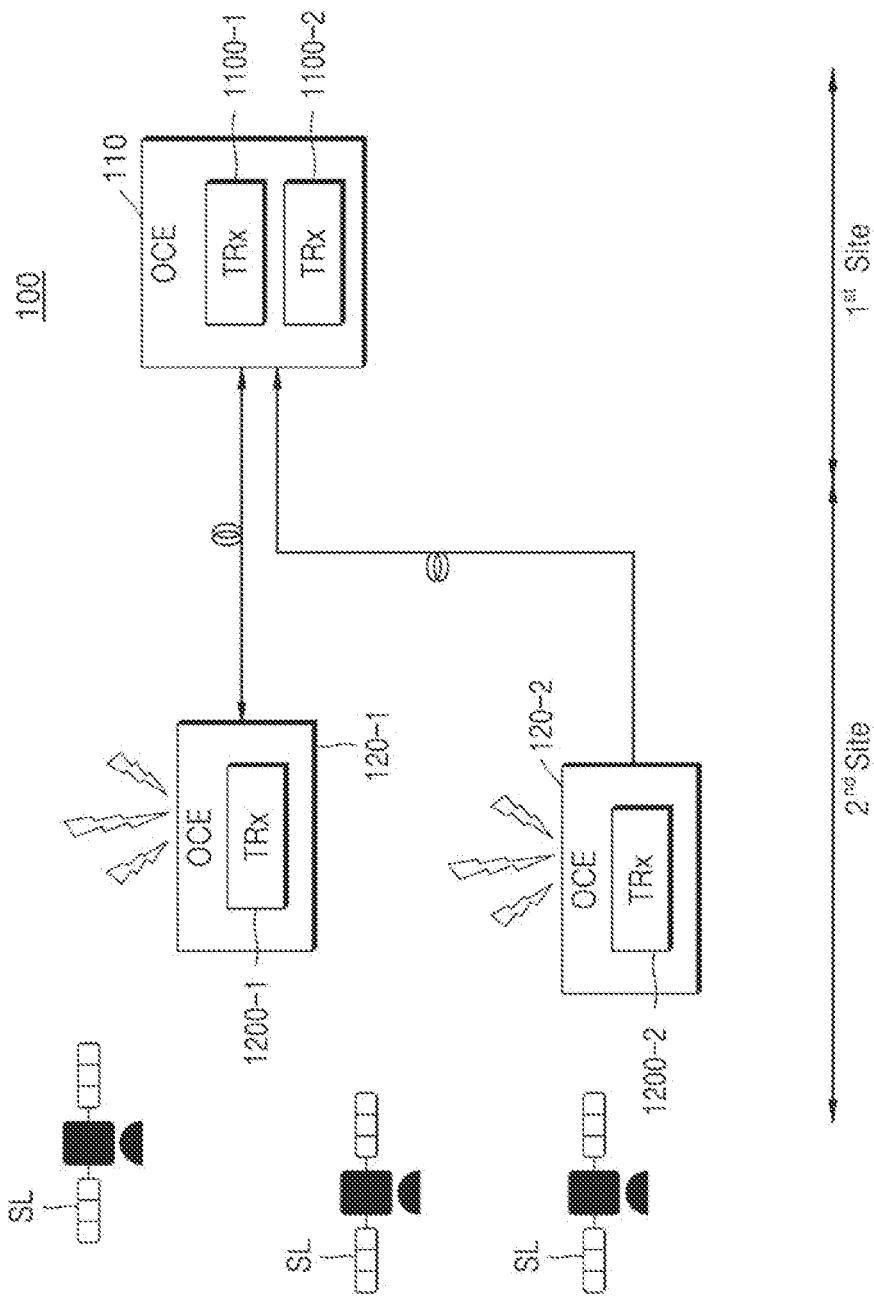
FIG. 1 is a view of an optical communication system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Hereinafter, various embodiments of the disclosure will be described in detail in order.

FIG. 1 is a view of an optical communication system according to an embodiment.

Referring to FIG. 1, an optical communication system 100 according to an embodiment may include an optical communication device 110 located at a first site and including at least two optical transceivers, and a plurality of optical communication devices 120-1 and 120-2 each located at each of second sites apart from the first site by a certain distance and including at least one optical transceiver. Meanwhile, FIG. 1 illustrates a topology in which the optical communication device 110 and the optical communication devices 120-1 and 120-2 are connected to each other in a point-to-multipoint structure, but is not limited thereto. An optical distribution network having various topologies may be further applied between the optical communication device 110 and the optical communication devices 120-1 and 120-2.

In some embodiments, the optical communication system 100 may be applied to a fronthaul transmission network of a distributed base station. In this case, the optical communication device 110 may be a digital unit (DU) of a central office, and the optical communication devices 120-1 and 120-2 may be radio units (RU), but are not limited thereto. The optical communication device 110 may be an optical line terminal (OLT) at a DU side, and the optical communication devices 120-1 and 120-2 may be an optical network unit (ONU) at a RU side.

In another embodiment, the optical communication system 100 may be applied to a distributed antenna system (DAS) for solving a shadow area of a base station. In this case, the optical communication device 110 may be a headend unit, and the optical communication devices 120-1 and 120-2 may be an extension unit or a remote unit.

Hereinafter, for convenience of description, assuming that the optical communication system 100 is applied to the fronthaul transmission network of the distributed base station, an embodiment in which the optical communication device 110 is a DU and the optical communication devices 120-1 and 120-2 are first and second RUs will be described.

The DU 110 is located at the central office (the first site), and the first and second RUs 120-1 and 120-2 are located at respective cell sites (the second sites) in remote locations, wherein each of the DU 110 and the first and second RUs 120-1 and 120-2 may be connected through a corresponding optical transceiver and an optical cable.

The DU 110 receives information for synchronization based on a GPS signal (hereinafter referred to as 'synchronization data') from each of the first and second RUs 120-1 and 120-2, and synchronizes a communication network using the synchronization data.

For example, each of the first and second RUs 120-1 and 120-2 may include a GPS receiver and receive GPS signals from satellites SL, and after generating the synchronization data by extracting information necessary for generating a reference synchronization signal (e.g. a clock signal) from the received GPS signals, the synchronization data may be transmitted to the DU 110. At this time, each of the first and second RUs 120-1 and 120-2 may transmit the synchronization data to the DU 110 through a communication channel separate from a channel for transmitting payload data corresponding to a mobile communication service signal to be transmitted. In addition, the DU 110 may synchronize a communication network by extracting a synchronization signal using the received synchronization data.

Hereinafter, an operation in which the DU 110 receives synchronization data from the first and second RUs 120-1 and 120-2 will be described in detail with reference to FIGS. 2 and 3.

Figure 2:
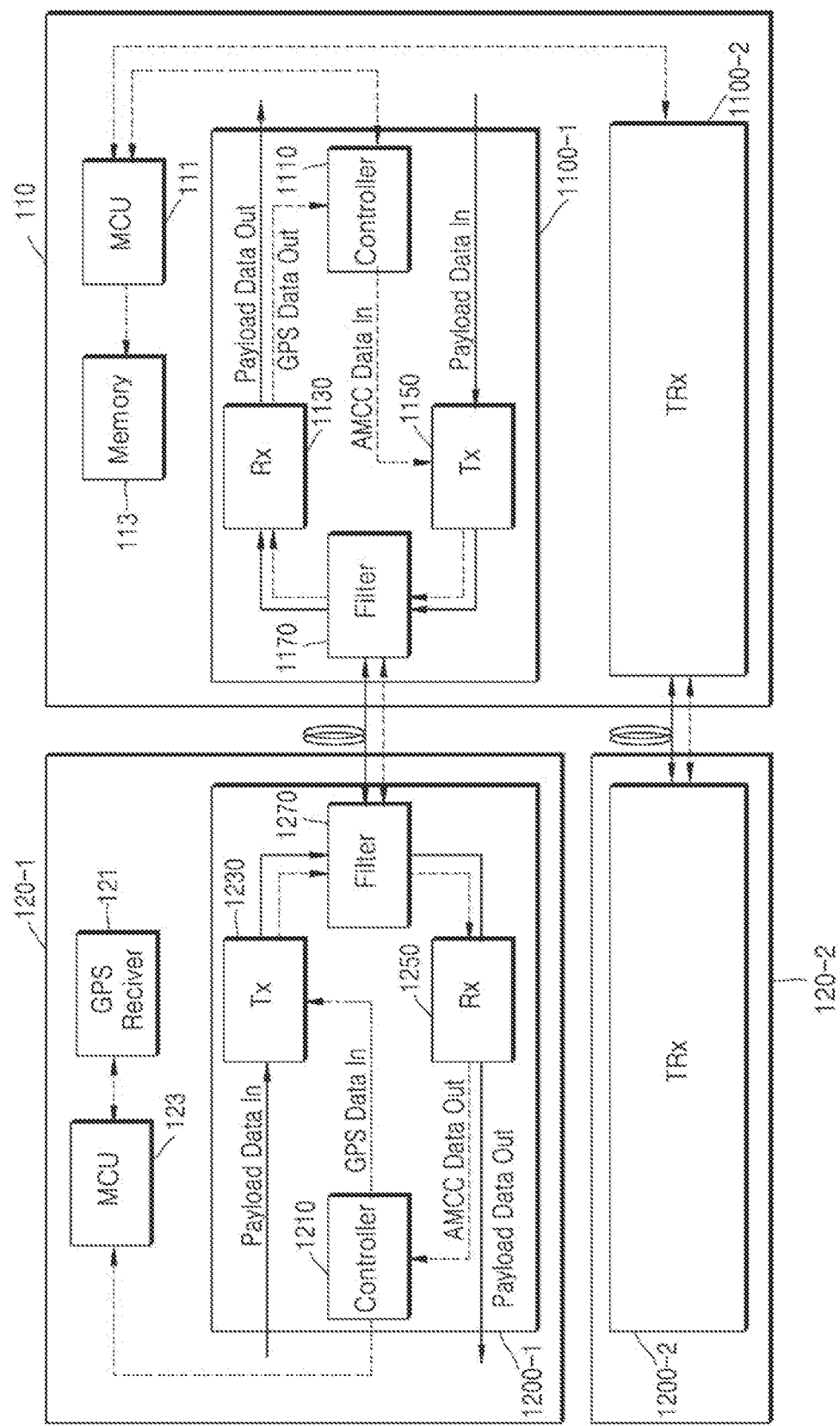
FIG. 2 is a block diagram illustrating in more detail a main portion of optical communication devices in an optical communication system according to an embodiment.
Figure 3:
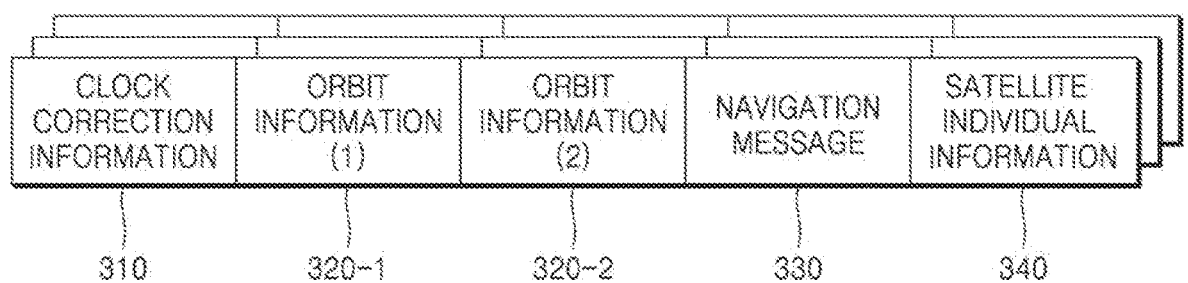
FIG. 3 is a configuration diagram of a GPS signal.

FIG. 2 is a block diagram illustrating in more detail a main portion of optical communication devices in an optical communication system according to an embodiment, and FIG. 3 is a configuration diagram of a GPS signal.

Referring to FIG. 2, among a plurality of optical communication devices constituting the optical communication system 100 according to an embodiment, the first RU 120-1 may include a GPS receiver 121, a main controller (MCU) 123, and an optical transceiver 1200-1. In addition, the optical transceiver 1200-1 may include a controller 1210, a transmitter 1230, a receiver 1250, and a filter 1270. Because the configuration and operation of the second RU 120-2 may be substantially the same as the configuration and operation of the first RU 120-1, a detailed description of the second RU 120-2 will not be given herein.

The MCU 123 may be a component that controls the overall operation of the first RU 120-1, and may analyze a GPS signal received through the GPS receiver 121.

For example, the GPS receiver 121 may receive and output a plurality of GPS signals from several satellites SL, and the MCU 123 may analyze a plurality of input GPS signals. The MCU 123 may analyze power of the plurality of input GPS signals to detect a GPS signal having the highest signal power, and may extract a preset navigation message from the GPS signal having the highest signal power.

Referring further to FIG. 3, a GPS signal may include five sub-frames. A first sub-frame 310 may correspond to clock correction information, second and third sub-frames 320-1 and 320-2 may correspond to information about the orbit of a satellite that has transmitted the GPS signal (hereinafter referred to as 'corresponding satellite'), a fourth sub-frame 330 may correspond to a navigation message, and a fifth sub-frame 340 may correspond to individual information of the corresponding satellite.

The fourth sub-frame 330 of the GPS signal may include information about an almanac capable of distinguishing time, and a clock signal that is a synchronization reference for a communication network may be extracted based on the information.

The MCU 123 does not transmit a detected GPS signal, and extracts information about the fourth sub-frame 330 essential for synchronization from the detected GPS signal in order to transmit information for synchronization using an auxiliary management and control channel (AMCC) having a limited resource (band) as described later below.

For another example, the MCU 123 may extract information about a navigation message from each of a plurality of input GPS signals. That is, the MCU 123 may extract a navigation message from any GPS signal without considering signal power for the plurality of input GPS signals.

Meanwhile, the MCU 123, in addition to the navigation message extracted from each of the input GPS signals, may extract or generate information indicating quality such as power of a corresponding GPS signal from the corresponding GPS signal.

Referring again to FIG. 2, the MCU 123 may generate synchronization data including the extracted navigation message(s). In addition to the navigation message, the synchronization data may further include information indicating quality such as signal power of a GPS signal corresponding to the navigation message. The MCU 123 may generate only synchronization data in which signal power corresponds to a GPS signal most, or may generate synchronization data corresponding to each of all received GPS signals.

The MCU 123 may output the generated synchronization data to the controller 1210 of the optical transceiver 1200-1.

The controller 1210 is configured to be connected to the MCU 123 by wire or wirelessly, and may manage transmission and reception of payload data, management and control (wavelength setting/control, communication status monitoring, etc.) information, and synchronization data (hereinafter collectively referred to as first auxiliary management data) between the DU 110 and the first RU 120-1.

The controller 1210 is an active component of the optical transceiver 1200-1, and may be a term collectively referring to a memory in which a processor, firmware, or the like that performs various controls and processes for transmitting low-speed first auxiliary management data through the AMCC along with high-speed payload data.

The controller 1210 may control the first auxiliary management data to be transmitted to the DU 110, more specifically, an optical transceiver 1100-1 of the DU 110 according to various methods.

For example, the controller 1210 may control the first auxiliary management data and payload data to be simultaneously transmitted to the optical transceiver 1100-1 of the DU 110 through a baseband intensity over-modulation method. For another example, the controller 1210 may control the first auxiliary management data and payload data to be superposed and transmitted to the optical transceiver 1100-1 of the DU 110 through a radio frequency (RF) pilot tone method.

The baseband intensity over-modulation method is a technology in which the first auxiliary management data is stacked on top of the payload data, and the RF pilot tone method is a technology of superposing ASK or FSK modulated first auxiliary management data with the payload data. A transmission rate of the first auxiliary management data may be different from a transmission rate of the payload data. For example, a frequency of the first auxiliary management data may be several kHz, and a frequency of the payload data may be tens to hundreds of MHz. A first auxiliary management data transmission/reception method, such as the baseband intensity over-modulation and the RF pilot tone method, has already been disclosed, and thus detailed contents thereof are omitted.

Meanwhile, the controller 1210 may control management and control data and synchronization data to be transmitted together in a time division manner from the first auxiliary management data through the AMCC. For example, the controller 1210 may modulate the management and control data and the synchronization data by an ASK, FSK method, etc., and may control the transmission of the management and control data and the synchronization data that are modulated, by dividing a band of the AMCC based on time.

As described above, as the controller 1210 outputs the synchronization data as the first auxiliary management data, the synchronization data may be transmitted to the optical transceiver 1100-1 of the DU 110 through a separate channel from the payload data through the transmitter 1230 to be described later below. That is, when an optical signal corresponding to the payload data is transmitted to the optical transceiver 1100-1 of the DU 110 through a first communication channel corresponding to a first wavelength, an optical signal corresponding to synchronization information may be transmitted to the optical transceiver 1100-1 of the DU 110 through a second communication channel (i.e., the AMCC) corresponding to a second wavelength.

The transmitter 1230 is configured to convert input payload data and/or the first auxiliary management data into an optical signal. The first transmitter 1230 may include transmitter optical sub-assemblies (TOSA) including a laser diode, a laser diode driving circuitry (LDD), a biasing circuitry, and the like. The payload data input to the first transmitter 1230 may be input through the LDD.

The filter 1270 may be configured such that a single optical cable is shared between the output of the transmitter 1230 and the input of the receiver 1250 to be described later below. The filter 1270 may transmit optical signals output from the transmitter 1230 through the single optical cable, and may transmit the optical signals received from the optical cable to the receiver 1250. According to an embodiment, the filter 1270 may be selectively omitted.

The receiver 1250 may divide an optical signal, which is filtered by the filter 1270 and input to the receiver 1250, into payload data and second auxiliary management data (the definition of the second auxiliary management data will be described later below), and may output them with corresponding configurations, respectively. In particular, the receiver 1250 may output the second auxiliary management data to the controller 1210. The receiver 1250 may include a receiver optical sub-assembly (ROSA) including a photo diode and a trans-impedance amplifier (TIA), a post amplifier, and the like.

As described above, the first RU 120-1 may receive a GPS signal from a satellite, may analyze the received GPS signal to generate synchronization data, and may transmit the synchronization data to the DU 110 together with the payload data using the AMCC.

Likewise, the second RU 120-2 may receive a GPS signal from a satellite, may analyze the received GPS signal to generate synchronization data, and may transmit the synchronization data to the DU 110 together with the payload data using the AMCC.

Among a plurality of optical communication devices constituting the optical communication system 100 according to an embodiment, the DU 110 may include a main controller (MCU) 111, a memory 113, and optical transceivers 1100-1 and 1100-2. The optical transceiver 1100-1 may include a controller 1110, a receiver 1130, a transmitter 1150, and a filter 1170. Because the configuration and operation of the optical transceiver 1100-2 may be substantially the same as the configuration and operation of the optical transceiver 1100-1, a detailed description of the optical transceiver 1100-2 will not be given herein.

The MCU 111 of the DU 110 is configured to control the overall operation of the DU 110, and may analyze synchronization data, which is received from the first and second RUs 120-1 and 120-2 through optical cables, with corresponding optical transceivers.

For example, the MCU 111 may analyze and compare the qualities of pieces of synchronization data respectively received from the first and second RUs 120-1 and 120-2 to select any one, and may generate a synchronization signal based on the selected synchronization data.

The MCU 111 may control synchronization of the DU 110 and the first and second RUs 120-1 and 120-2 based on the generated synchronization signal. According to an embodiment, the MCU 111 may transmit the generated synchronization signal to other DUs communicatively connected to the DU 110, an interworking network, or the like, so that a communication network is entirely synchronized.

The memory 113 may be a storage unit that is connected to the MCU 111 and stores a variety of information and program instructions necessary for the operation of the DU 110. The synchronization data and the synchronization signal may be stored in the memory 113. The synchronization data may be information received from the first and second RUs 120-1 and 120-2 through the AMCC.

The controller 1110 is connected to the MCU 111 by wire or wirelessly, and is configured to manage transmission and reception of payload data and information (hereinafter referred to as second auxiliary management data) for management and control (wavelength setting, communication status monitoring, etc.) between the DU 110 and the first RU 120-1, and may receive synchronization data from the first RU 120-1 in addition to information necessary for auxiliary management of transmission and reception of payload data.

The filter 1170 and the receiver 1130 may filter an optical signal received from the first RU 120-1 and output synchronization data to the controller 1110.

In addition, the transmitter 1150 and the filter 1170 may generate an optical signal by superposing payload data to be transmitted to the first RU 120-1 and the second auxiliary management data, and may filter and transmit the optical signal to the first RU 120-1.

Because the transmitter 1150, the receiver 1130, and the filter 1170 are substantially the same as the transmitter 1230, the receiver 1250, and the filter 1270 described above, respectively, detailed descriptions will not be given herein.

As described above, because synchronization data (based on a GPS signal) for system synchronization is transmitted between optical communication devices through the AMCC in the optical communication system 100 according to the embodiments, transmission of information for synchronization may be performed without affecting the transmission of payload data.

Hereinabove, the disclosure has been described with reference to the preferred embodiments. However, it will be appreciated by one of ordinary skill in the art that various modifications and changes of the disclosure can be made without departing from the spirit and the scope of the inventive concept which are defined in the appended claims and their equivalents.

The invention claimed is:

1. An optical communication device comprising:
   a global positioning system (GPS) receiver receiving and outputting a GPS signal from a satellite;
   a main controller configured to generate and output GPS data based on the GPS signal; and
   an optical transceiver configured to generate an optical signal by superposing input payload data and the GPS data, and to output the optical signal,
   wherein a first communication channel corresponding to the payload data and a second communication channel corresponding to the GPS data are different communication channels,
   wherein the second communication channel is an auxiliary management and control channel (AMCC) for transmitting management and control data of an optical transceiver of another optical communication device, and
   wherein the GPS data is transmitted through the AMCC with the management and control data, and includes information for synchronization between the optical communication device and the other optical communication device.

2. The optical communication device of claim 1, wherein the optical transceiver comprises:
   a controller receiving the GPS data and outputting the GPS data and the management and control data as auxiliary management and control data for management and control of the optical transceiver of the other optical communication device; and
   a transmitter generating the optical signal by superposing the input payload data and the auxiliary management and control data.

3. The optical communication device of claim 1, wherein the main controller extracts a navigation message from the GPS signal to generate the GPS data, and transmits the GPS data to the optical transceiver.

4. An optical communication device comprising:
   a first optical transceiver receiving a first optical signal, in which first payload data and first synchronization data are superposed, from a first other optical communication device connected to the first optical transceiver through a first optical cable, and separating the first synchronization data from the first optical signal and outputting the first synchronization data;
   a second optical transceiver receiving a second optical signal, in which second payload data and second synchronization data are superposed, from a second other optical communication device connected to the second optical transceiver through a second optical cable, and separating the second synchronization data from the second optical signal and outputting the second synchronization data; and
   a main controller configured to extract a reference synchronization signal by analyzing the first synchronization data and the second synchronization data,
   wherein the first payload data and the first synchronization data are received through different communication channels,
   wherein the second payload data and the second synchronization data are received through different communication channels,
   wherein the first synchronization data includes a first navigation message extracted from a global positioning system (GPS) signal received from the first other optical communication device, and
   wherein the second synchronization data includes a second navigation message extracted from a GPS signal received from the second other optical communication device.

5. The optical communication device of claim 4, wherein the main controller selects one of the first synchronization data and the second synchronization data based on a result of the analyzing of the first synchronization data and the second synchronization data, and extracts the reference synchronization signal from the selected synchronization data.

6. The optical communication device of claim 4, wherein the first synchronization data and the second synchronization data are received through an auxiliary management and control channel (AMCC).

7. An optical communication system comprising:
   a plurality of first optical communication devices each configured to transmit an optical signal in which payload data and synchronization data corresponding to a global positioning system (GPS) signal are superposed; and
   a second optical communication device receiving the optical signal from each of the plurality of first optical communication devices, separating the synchronization data from the optical signal, and extracting a reference synchronization signal based on the synchronization data,
   wherein the payload data and the synchronization data are transmitted through different communication channels, and
   wherein each of the synchronization data includes a navigation message extracted from a GPS signal received from each of the plurality of first optical communication devices.

8. The optical communication system of claim 7, wherein the synchronization data includes a navigation message extracted from the GPS signal.

9. The optical communication system of claim 7, wherein the second optical communication device analyzes synchronization data transmitted from each of the plurality of first optical communication devices, and extracts the reference synchronization signal from synchronization data selected based on a result of the analyzing.

10. The optical communication system of claim 7, wherein the synchronization data is transmitted through an auxiliary management and control channel (AMCC).

* * * * *